(12) United States Patent
Manoel et al.

(10) Patent No.: US 12,186,691 B2
(45) Date of Patent: Jan. 7, 2025

(54) BAG FOR PRESSURE LEAF FILTER

(71) Applicant: Valmet Technologies Oy, Espoo (FI)

(72) Inventors: Marilene Amaral Leite Manoel, Contagem (BR); Rafael de Felipe Zica, Belo Horizonte (BR); Siterzany Fonseca, Belo Horizonte (BR); Wallace Farias Bacelar, Congonhas (BR); Thiago Pavan, Belo Horizonte (BR)

(73) Assignee: Valmet Technologies Oy, Espoo (FI)

( * ) Notice: Subject to any disclaimer, the term of this patent is extended or adjusted under 35 U.S.C. 154(b) by 903 days.

(21) Appl. No.: 17/323,071

(22) Filed: May 18, 2021

(65) Prior Publication Data

US 2021/0362084 A1   Nov. 25, 2021

(30) Foreign Application Priority Data

May 19, 2020 (FI) .................................... 20205502

(51) Int. Cl.
*B01D 46/00* (2022.01)
*B01D 46/02* (2006.01)
(52) U.S. Cl.
CPC ....... *B01D 46/0004* (2013.01); *B01D 46/001* (2013.01); *B01D 46/023* (2013.01)
(58) Field of Classification Search
None
See application file for complete search history.

(56) References Cited

U.S. PATENT DOCUMENTS

| | | | | |
|---|---|---|---|---|
| 1,767,523 A | * | 6/1930 | Frankenhoff | B01D 29/39 210/232 |
| 3,203,551 A | * | 8/1965 | Loan, Jr. | B01D 29/27 55/369 |
| 3,542,206 A | * | 11/1970 | Geister | B01D 29/111 210/486 |
| 4,022,695 A | * | 5/1977 | Howard | B01D 29/39 55/369 |
| 4,153,090 A | * | 5/1979 | Rifkin | B65D 29/00 383/61.3 |

(Continued)

FOREIGN PATENT DOCUMENTS

| | | | | |
|---|---|---|---|---|
| JP | H0621709 U | * | 3/1994 | |
| WO | WO-2010091515 A1 | * | 8/2010 | B01D 29/39 |
| WO | WO-2014194425 A1 | * | 12/2014 | B01D 29/27 |

OTHER PUBLICATIONS

Finnish Patent and Registration Office Search Report for FI 20205502 dated Nov. 26, 2020.

*Primary Examiner* — Brit E. Anbacht
(74) *Attorney, Agent, or Firm* — Stiennon & Stiennon

(57) ABSTRACT

A leaf filter bag for a leaf (110) of a pressure leaf filter (100) has a first sheet portion (50), adjacent to a second sheet portion (60). The first sheet portion (50) is connected to the second sheet portion (60) at a first edge (10), a second edge (20) and a third edge (30). Forth edges of the sheet portions define an openable and closable edge (40) which has an open position and a closed position, which allows inserting a frame (122) of the leaf (110) into the leaf filter bag (1) through an opening formed by the openable and closable edge (40) in the open position. A zipper (42) closure (41) is provided at the openable and closable edge (40), and a further hook-and-loop fastener closure may be provided.

15 Claims, 10 Drawing Sheets

(56) References Cited

U.S. PATENT DOCUMENTS

| | | | | | |
|---|---|---|---|---|---|
| 4,790,040 | A * | 12/1988 | Grilliot | ............... | A47G 9/086 5/413 R |
| 5,533,216 | A * | 7/1996 | Thier | ................. | A47G 9/086 5/413 R |
| 5,816,709 | A * | 10/1998 | Demus | ................ | A45C 11/22 383/88 |
| 5,996,799 | A * | 12/1999 | Garreth | ............... | B65D 77/04 206/521 |
| 6,007,594 | A * | 12/1999 | Kaczor | ................ | A47L 9/149 55/377 |
| 6,186,201 | B1 * | 2/2001 | Salz | ..................... | A45C 3/08 150/113 |
| 6,446,303 | B1 * | 9/2002 | Paterson | ............... | A47L 9/14 55/369 |
| 9,993,755 | B2 * | 6/2018 | Parent | ................. | B01D 29/27 |
| 2004/0232058 | A1 * | 11/2004 | Silverstein | ........... | B01D 29/27 210/167.17 |
| 2010/0256716 | A1 * | 10/2010 | Haislip | ............... | A47G 9/086 5/413 R |
| 2012/0255125 | A1 * | 10/2012 | Brown | ................ | A47G 9/083 5/413 R |
| 2014/0068834 | A1 * | 3/2014 | Skinner | ............... | A41B 13/06 2/69.5 |
| 2016/0121247 | A1 * | 5/2016 | Parent | ................. | B01D 29/39 210/232 |
| 2020/0317441 | A1 * | 10/2020 | Beale | .................. | B32B 29/02 |

\* cited by examiner

BAG FOR PRESSURE LEAF FILTER

CROSS REFERENCES TO RELATED APPLICATIONS

This application claims priority on Finnish App. No. FI 20205502, filed May 19, 2020, the disclosure of which is incorporated by reference herein.

STATEMENT AS TO RIGHTS TO INVENTIONS MADE UNDER FEDERALLY SPONSORED RESEARCH AND DEVELOPMENT

Not applicable.

BACKGROUND OF THE INVENTION

This invention relates to filter bags for pressure leaf filters. This invention particularly relates to a closure of a filter bag. The invention further relates to an installation method for installing a filter bag onto a leaf of a pressure leaf filter. Further, this invention relates to a use of a filter bag in alumina production.

Aluminum oxide, i.e., alumina, is used for aluminum metal production. Aluminum is a light, strong and corrosion-resistant metal. Its ore, i.e., bauxite, can be relatively easily extracted, but obtaining alumina from the bauxite can be a quite difficult process. Typically, separating alumina from crushed bauxite involves high pressure and temperature. Further, the process needs filtering steps. Pressure leaf filters used for alumina production typically undergo very harsh condition due to the chemicals and temperature used for alumina extraction. Pressure leaf filters typically operate within a pressure range of up to 5 bars.

The filter bags of pressure leaf filters must be changed from time by time; hence, the pressure leaf filters typically use changeable filter bags. The filter bags of the pressure leaf filter need to be sealed due to the high pressure and, further, to minimize the presence of solids in the filtrate stream. Typically, each filter bag is sealed during the installation process by using a manual sewing machine.

SUMMARY OF THE INVENTION

The present invention discloses a novel filter bag for a pressure leaf filter. Further, the present invention discloses a novel installation method for installing a filter bag onto a leaf of a pressure leaf filter. Still further, the present invention discloses a use of a filter bag in alumina production.

The object of the present invention is to provide an improved filter bag for a pressure leaf filter. The filter bag is preferably a single pocket filter bag, i.e., a filter bag having only one pocket.

The conventional installation process with manual sewing has some major disadvantages. For example, the safeness of individuals installing the filter bag cannot always be guaranteed due to the manual sewing process needed for an installation of a conventional filter bag. Further, the job usually takes a long time and typically needs several trained individuals. Furthermore, ergonomic issues may also be a problem due to weight of the manual sewing machines. Still further, the manual sewing machine needs maintenance of its own. Moreover, a quality of the manual sewing can be crucial for the needed performance of the filter bag. For example, if the sewing fails, the filter bag may fall from the metallic support, which can cause production loss and clogging of a filter.

The novel leaf filter bag can be suitable for pressure leaf filters comprising a leaf.

The leaf filter bag can comprise a first sheet portion, and a second sheet portion, wherein the first sheet portion is adjacent to the second sheet portion. The adjacent sheet portions can comprise three edges comprising a first edge, a second edge and a third edge so that the first sheet portion is connected to the second sheet portion at the three edges. The adjacent sheets can further comprise one openable and closable edge, which openable and closable edge allows inserting a frame of the leaf through the openable and closable edge.

The first edge can be parallel to the second edge. Further, the openable and closable edge can be parallel to the third edge and perpendicular to the first edge and the second edge. Thus, the openable and closable edge can extend from the first edge to the second edge.

The frame is typically inserted through the openable and closable edge vertically when the filter bag is installed onto a leaf of a vertical pressure leaf filter. Further, the frame is typically inserted through the openable and closable edge horizontally, when the filter bag is installed onto a leaf of a horizontal pressure leaf filter.

The leaf filter bag can further comprise a closure comprising a zipper for closing the openable and closable edge, which zipper can be fixed along the length of the openable and closable edge of the leaf filter bag.

The preferred length of the zipper is at least the length of the openable and closable edge.

The first sheet portion, and the second sheet portion can comprise materials that show evidence of withstanding the operating conditions. The materials can comprise or consist of polypropylene and/or polyamide.

A thickness of the first sheet portion, as well as a thickness of the second sheet portion, is preferably from 0.1 mm to 5 mm.

A width and a length of the leaf filter bag can be selected according to a size of the leaf. The width and the length of the leaf filter bag can each be, e.g. from 500 mm to 25 m.

The closure can further comprise a hook-and-loop fastener, which hook-and-loop fastener can be fixed along the length of the openable and closable edge. The hook-and-loop fastener can comprise polypropylene and/or polyamide and/or other materials that show evidence of withstanding the operating conditions.

The hook-and-loop fastener can be adapted to cover the zipper or at least part of the zipper. Preferably, the hook-and-loop fastener is adapted to cover at least 80%, more preferably at least 90% of the length of the zipper.

Alternatively, the zipper can be adapted to close the filter bag so that the hook-and-loop fastener, or at least part of the hook-and-loop fastener, is inside the filter bag. The zipper can be adapted to close the filter bag so that at least 80%, more preferably at least 90% of the hook-and-loop fastener is inside the filter bag, calculated from the length of the hook-and-loop fastener.

Therefore, it is possible to seal the openable and closable edge and, further, to protect the sealing.

With vertical pressure leaf filters, the preferred length of the hook-and-loop fastener can be at least the length of the openable and closable edge.

With horizontal pressure leaf filters, the preferred length of the hook-and-loop fastener can be at least the length of the openable and closable edge from an outlet pipe aperture to the first edge.

Therefore, openable and closable edge can comprise the outlet pipe aperture for an outlet pipe of the leaf. In this embodiment, the closure can be placed along the entire length of the openable and closable edge, at least from the first edge to the outlet pipe aperture. For example, the zipper can be placed along the entire length of the openable and closable edge, at least from the first edge of the leaf filter bag to the outlet pipe aperture of the leaf filter bag. Furthermore, the hook-and-loop fastener can be placed along the entire length of the openable and closable edge, at least from the first edge of the leaf filter bag to the outlet pipe aperture of the leaf filter bag.

The components of the hook-and-loop fastener can be fastened to inner side(s) of the sheet portion(s), and/or to outer side(s) of the sheet portion(s). For example, it is possible to fasten a first component of the hook-and-loop fastener e.g. to the inner side of the first sheet portion, and a second component of the hook-and-loop fastener e.g. to the outer side of the second sheet portion.

The closure can further comprise one or more than one hook-and-loop strip.

A novel arrangement can comprise a leaf filter bag and a vertical pressure leaf filter, wherein the leaf filter bag is secured on to a leaf of the vertical pressure leaf filter.

Alternatively, an arrangement can comprise a leaf filter bag and a horizontal pressure leaf filter, wherein the leaf filter bag is secured on to a leaf of the horizontal pressure leaf filter.

An installing method for installing a leaf filter bag on to a leaf of a pressure leaf filter can comprise the following steps:
 providing a filter bag comprising a closure comprising a zipper,
 inserting the leaf into the leaf filter bag through an openable and closable edge, and
 securing the filter bag onto the leaf of the pressure leaf filter by using the closure.

The filter bag can further comprise a hook-and-loop fastener comprising a hook component fixed to a first sheet portion and a loop component fixed to the second sheet portion, and the installing method can further comprise the following step:
 fastening the hook component to a loop component.

The filter bag can further comprise one or more than one hook-and-loop strip, and the installing method can further comprise the following step(s):
 attaching the filter bag onto the leaf by using the hook-and-loop strip(s) before securing the filter bag onto the leaf, and/or
 sealing an outlet pipe aperture of the filter bag onto an outlet pipe of the leaf by using the one or more than one hook-and-loop strip.

The leaf filter bag is preferably used in alumina production. Alternatively, the leaf filter bag can be used e.g. in sugar production.

The novel installation process of a filter bag does not need to have a step, wherein the filter bag is sealed by manually sewing with a manual sewing machine. Thus, the novel installation method can be a fast and easy method for installing the filter bag onto a leaf of a pressure leaf filter. For example, machine downtime may be decreased, because the filter bag can be changed into a new one efficiently. This can significantly reduce costs and increase effectiveness of a plant site.

Thanks to the novel solution, the novel filter bag can be used with different kinds of pressure leaf filters. The novel filter bag can be adapted for a leaf of a horizontal pressure leaf filter or a leaf of a vertical pressure leaf filter

BRIEF DESCRIPTION OF THE DRAWINGS

In the following, the invention will be illustrated by drawings.

FIGS. 3-6b illustrate embodiments of a filter bag, which is adapted for a horizontal pressure leaf filter.

FIG. 3 illustrates an example of a filter bag on a leaf, examined in a first direction.

FIG. 4 illustrates a perspective view of a part of a filter bag comprising a zipper, a hook-and-loop fastener, and a hook-and-loop strip.

FIGS. 6a-b illustrate a perspective view of a part of a filter bag comprising a zipper.

FIG. 7 and FIGS. 8a-b illustrate a perspective view of an openable and closable edge, before sealing the closure.

FIG. 9a illustrates a perspective view of an openable and closable edge, wherein the hook-and-loop fastener is closed but the zipper is still open.

FIG. 9b illustrates a perspective view of the openable and closable edge, which is sealed.

The figures are schematic. Similar parts are indicated in the figures by the same reference numbers.

DESCRIPTION OF THE PREFERRED EMBODIMENTS

Figure 1:
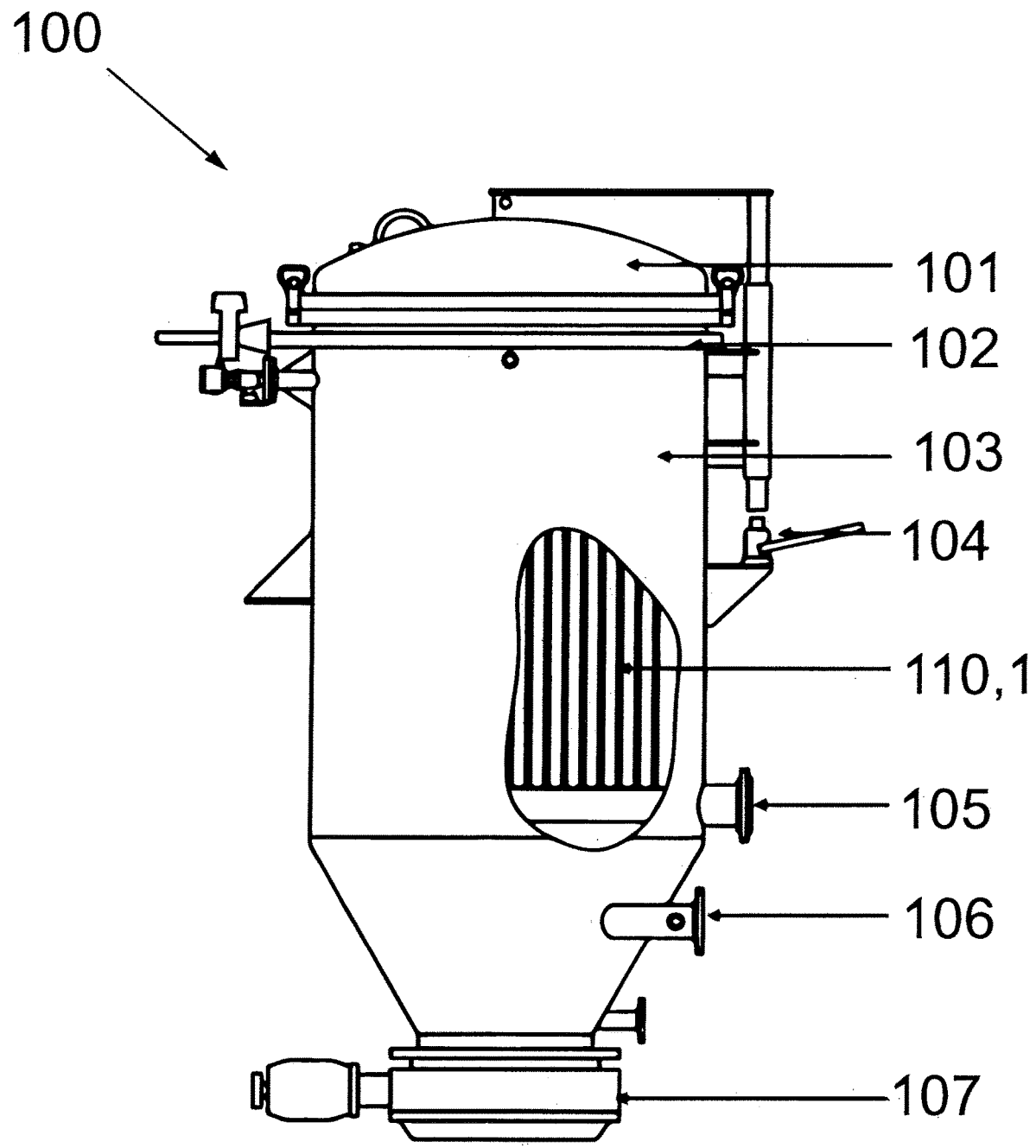
FIG. 1 illustrates an example of a vertical pressure leaf filter.

All embodiments in this application are presented as illustrative examples, and they should not be considered limiting.

The following reference numbers are used in this application:
 1 leaf filter bag,
 10 first edge, i.e., first closed edge of the leaf filter bag,
 20 second edge, i.e., second closed edge of the leaf filter bag,
 30 third edge, i.e., third closed edge of the leaf filter bag,
 40 fourth edge of the leaf filter bag, i.e., openable and closable edge of the leaf filter bag,
 41 closure of the openable and closable edge,
 41a first end of the closure,
 41b second end of the closure,
 42 zipper,
 43 hook-and-loop fastener,
 44 hook component of the hook-and-loop fastener,
 45 loop component of the hook-and-loop fastener,
 46 hook-and-loop strip(s),
 46a first hook-and-loop strip,
 46b second hook-and-loop strip, 46c third hook-and-loop strip,
49 outlet pipe aperture,
50 first sheet portion of the leaf filter bag,
51 inner side of the first sheet portion,
60 second sheet portion of the leaf filter bag,
61 inner side of the second sheet portion,
62 first flap on first sheet portion,
64 second flap on second sheet portion,
66 exterior surface of first sheet portion,
68 exterior surface of second sheet portion,
70 pipe flap,
100 pressure leaf filter,
101 filter lid,
102 filtrate outlet collector,
103 filter enclosure,
104 filter lid opening system,
105 drain port,
106 feed inlet port,
107 discharge system,
110 a leaf of a pressure leaf filter,
111 mesh of the leaf 110,
112 frame of the leaf 110, and
113 outlet pipe.

In this application, the term "pressure leaf filter" refers to a pressure leaf filter, which is able to operate within a pressure level up to 5 bars. The pressure leaf filter can be operating, for example, in alumina production or in sugar production.

The pressure leaf filter 100 can be a vertical pressure leaf filter or a horizontal pressure leaf filter. An installation process of the filter bag 1 may be more challenging when the filter bag 1 is installed onto a vertical pressure leaf filter than when the filter bag is installed onto a leaf of a horizontal pressure leaf filter. Thus, the novel solution can be particularly advantageous with vertical pressure leaf filters, because replacing filter bags by using conventional methods may be particularly challenging with that kind of filter. Further, the novel solution can also improve the easiness of an installation process with horizontal pressure filters.

The novel filter bag 1 has suitable sealing properties for a pressure leaf filter, i.e., a leaf filter which is operating within a pressure level up to 5 bars.

In this application, the term "vertical pressure leaf filter" refers to such a pressure leaf filter, wherein leaves are vertically placed. The vertical pressure leaf filter can be used, for example, in alumina production.

In this application, the term "horizontal pressure leaf filter" refers to such a pressure leaf filter, wherein leaves are horizontally placed. The horizontal pressure leaf filter can be used, for example, in alumina production.

In an advantageous embodiment, the filter bag 1 is used in alumina production. Thus, the filter bag 1 is preferably made of resistant material(s). In alumina production, the filter bag may undergo very harsh conditions due to high pH and temperature used for alumina extraction.

In another embodiment, the filter bag 1 is used in a sugar production.

Filter bags 1 of the pressure leaf filter 100 must be changed from time by time, hence, the pressure leaf filter 100 typically uses changeable filter bags. The filter bag 1 of the pressure leaf filter 100 is sealable.

One example of the pressure leaf filter is shown in FIG. 1. The pressure leaf filter 100 comprises a leaf 110 of the pressure leaf filter 100. The pressure leaf filter may further comprise a filter lid 101, a filtrate outlet collector 102, a filter enclosure 103, a filter lid opening system 104, a drain port 105, a feed inlet port 106, and a discharge system 107.

Figure 2:
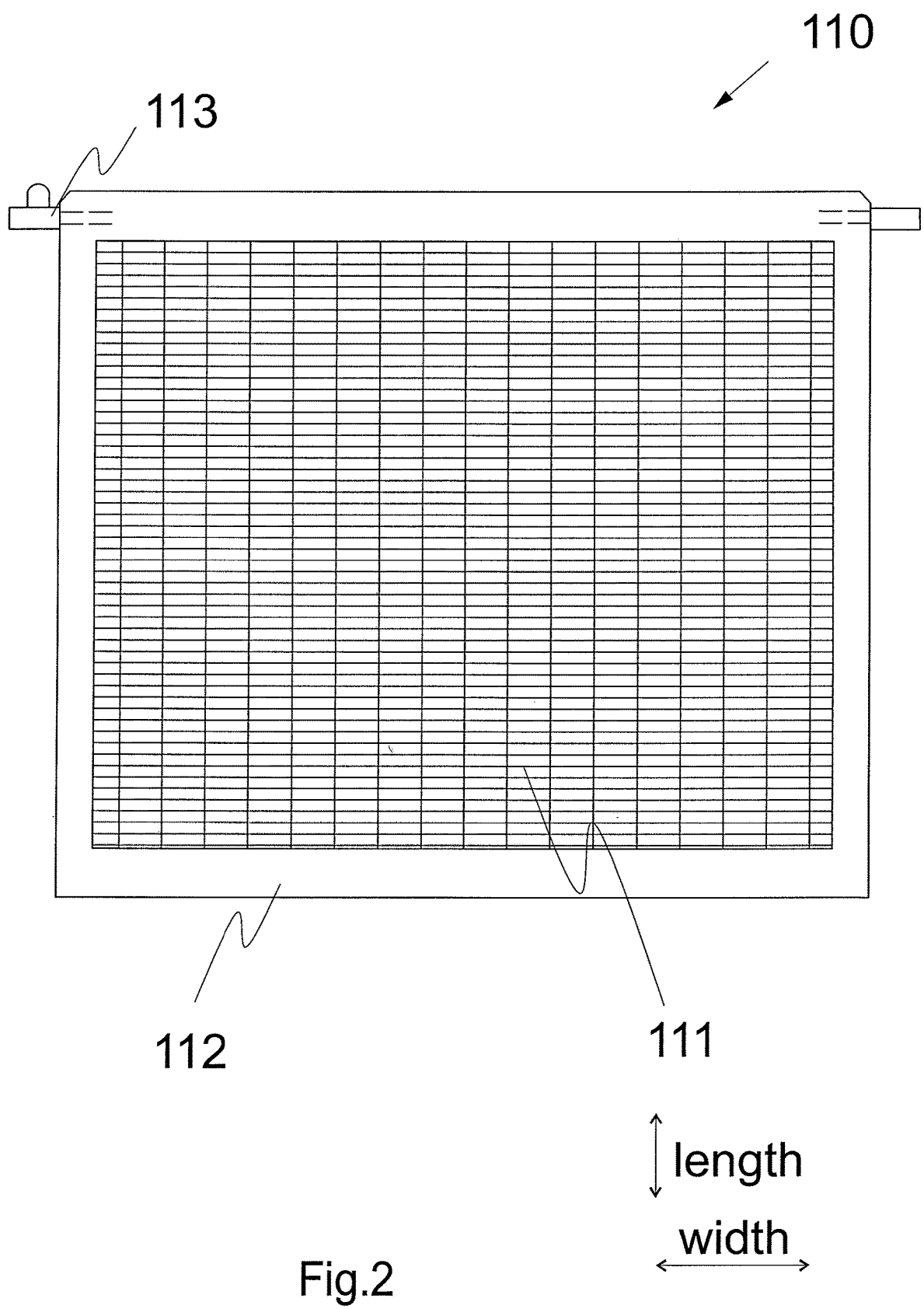
FIG. 2 illustrates an example of a leaf, examined in a first direction.

An example of a leaf 110 is illustrated in FIG. 2. The pressure leaf filter 100 can efficiently remove solid materials from fluid for purification of the fluid. The pressure leaf filter 100 typically has several leaves 110. Each leaf 110 can comprise a filtrating mesh 111, such as a steel mesh. Further, the leaf 110 can comprise a frame 112, such as a steel frame, supporting the mesh 111. Still further, the leaf can comprise an outlet pipe 113 for filtrate.

Figure 3:
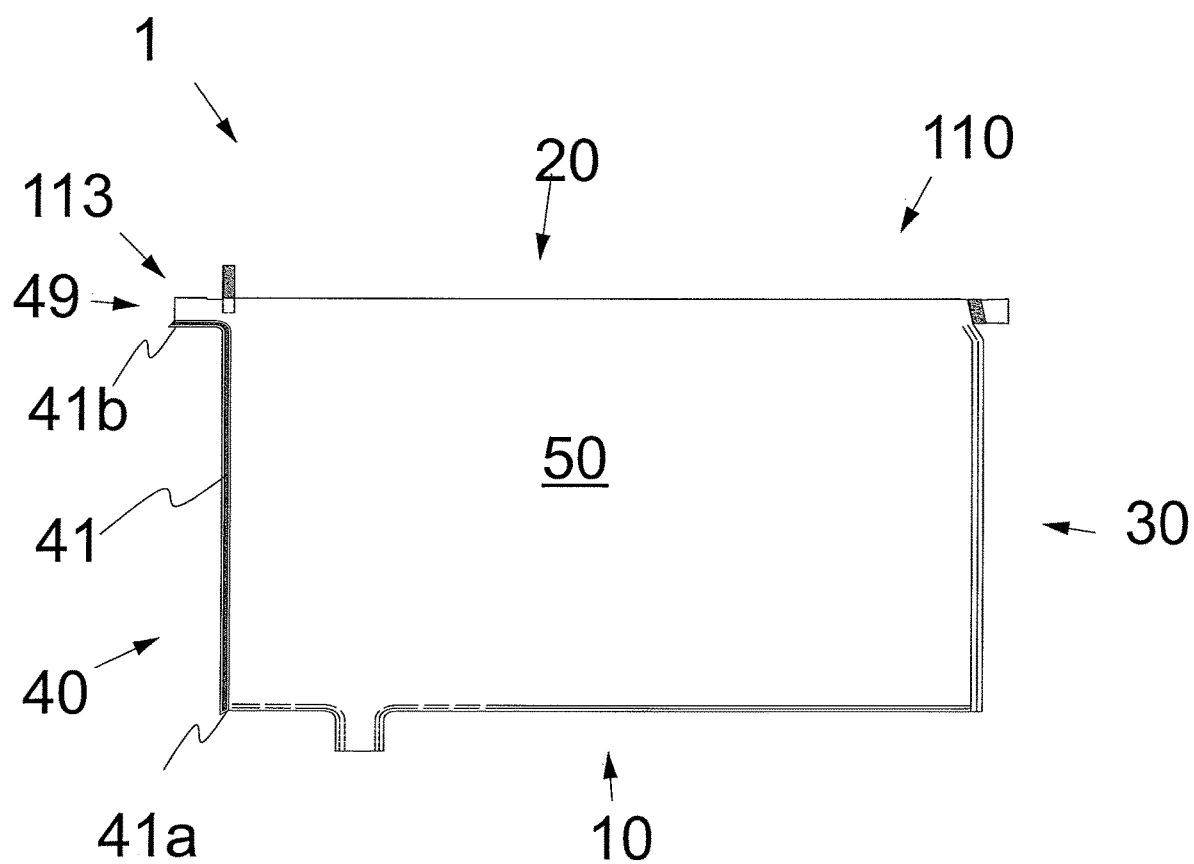

Each leaf 110 can have its own filter bag 1, i.e. a filtration fabric covering the filtrating mesh 111. Some examples of the leaf filter bag 1 are shown e.g. in FIGS. 3 and 7.

In an example, the solution intended to be filtered is pumped into the pressure leaf filter 100 during the filtering process. When the vessel of the pressure leaf filter 100 is full, the pressure rises due to a pumping action, and the solution flows through the leaf filter bag 1 as well as across the mesh 111 of the leaf 110, and the filtrate can be extracted through an outlet pipe 113. Thus, the filter bag 1 can have an outlet pipe aperture 49 for the outlet pipe 113.

As discussed above, the filtrate goes through the leaf 110 and out of the pressure leaf filter 100. Each leaf 110 can have its own outlet(s) 113 for the filtrate. However, filtrated solid particles can remain on the leaf 110 as a filter cake. Typically, the filter cake improves the filtrating effect, i.e., the filter cake is typically necessary to obtain clear filtrate. Thus, the leaf 110 acts as a support mechanism for the cake.

In alumina production, the filtrate, i.e., purified solution comprising solubilized alumina, is ready for production of solid alumina.

The filter bags 1 are consumable elements which are subject to regular replacement, typically at each 4-6 weeks. Thus, typically, each filter bag 1 is replaced almost every month. Thus, one plant may use from 500 to 3,000 filter bags every year, depending on type and size of the plant. Thus, an easy and fast installation process of filter bags 1 can save time and money.

The internal structure of the pressure leaf filter 100 has a plurality of leaves 110, as shown in FIG. 1. The amount of leaves 110 in one pressure leaf filter 100 may be, for example, between 15 and 20. One pressure leaf filter 100 may have leaves 110 of various sizes engineered to adapt to the space available in the cylindrical shell of the pressure leaf filter 100.

As discussed above, the leaf 110 can comprise a frame 112 having a steel structure supporting a mesh 111, such as a steel mesh. The mesh 111 can be covered by the filter bag 1. Some embodiments of the filter bag 1, or a part of the filter bag 1, are shown in FIGS. 3-9b.

The filter bag 1 can have a planar or substantially planar first surface 50, i.e., a first sheet portion 50, and a planar or substantially planar second surface 60, i.e., a second sheet portion 60.

Therefore, the leaf filter bag 1 can comprise a first sheet portion 50 and a second sheet portion 60, which can form two adjacent sheet portions.

The first sheet portion 50 and the second sheet portion 60 can comprise materials which are shown evidence of withstanding the operating conditions. The first sheet portion and the second sheet portion can comprise
polypropylene, and/or
polyamide, and/or
polyethylene terephthalate (PET), and/or
polyester (PES), and/or
polyvinylidene difluoride (PVDF), and/or
polyphenylene sulfide (PPS), and/or
polytetrafluoroethylene (PTFE), and/or
polyether ether ketone (PEEK), the amount of said materials being preferably at least 60 wt. %, more preferably at least 80 wt. %, and most preferably at least 90 wt. %, calculated from total dry weight of the sheet portions 50, 60. However, the polyester (PES) may not be preferred material for alumina applications due to harsh operating conditions therein.

Most advantageously, the first sheet portion 50 and the second sheet portion 60 comprise or consist of polypropylene and/or polyamide. The amount of the polypropylene and/or polyamide is preferably at least 60 wt. %, more preferably at least 80 wt. % and most preferably at least 90 wt. %, calculated from total dry weight of the sheet portions 50, 60. These materials can be particularly suitable for filter bags used in alumina production.

Said adjacent sheet portions 50, 60 can form three closed edges 10, 20, 30 and one openable and closable edge 40. The closed edges 10, 20, 30 are at least mainly closed and able to keep the operating pressure of the filter bag 1. The closed edges can be, for example, sewn.

The first edge 10 can be parallel to the second edge 20. The third edge 30 can be parallel to the openable and closable edge 40. The third edge 30 can be perpendicular to the first edge 10 and to the second edge 20. The openable and closable edge 40 can be perpendicular to the first edge 10 and to the second edge 20. Thus, the openable and closable edge 40 can extend from a first end of the first edge to a first end of the second edge. The sheet portions 50, 60 connected along the three edges thereby define an interior volume suited for the reception of a filter leaf, the interior volume being accessible through the open and closable edge 40.

The openable and closable edge 40 has a closure 41 which enables the leaf filter bag to be operable between an open position where it receives the entry of a filter leaf, and a closed position where the filter leaf is received and enclosed within the interior volume. The closure 41 is typically open when the mesh 111 is inserted into the leaf filter bag 1, after which the closure 41 can be closed and sealed.

Therefore, the closure 41 of the openable and closable edge 40 can be open to allow inserting a mesh frame 112 through the openable and closable edge 40. Further, the closure 41 of the openable and closable edge 40 can be closed to seal the openable and closable edge 40.

The closure 41 can have a first end 41a near the first edge 10 and a second end 41b near the second edge 20. Thus, the closure 41 can be placed along the entire length of the openable and closable edge 40. However, the openable and closable edge 40 can comprise an outlet pipe aperture 49, in which case the outlet pipe aperture 49 is not typically closed but allows the outlet pipe 113 to go through the outlet pipe aperture 49.

Thus, the closure 41 can be placed along the entire length of the openable and closable edge 40 from the first closed edge 10 to the outlet aperture 49 or to the second edge 20. Thus, it is possible to seal the leaf filter bag 1 while letting the filtrate out via the outlet pipe 113 of the leaf 110.

The closure 41 can comprise a hook-and-loop fastener 43 as shown e.g. in FIGS. 4-5b and 7-9a. The hook-and-loop fastener 43, also known as a touch fastener, typically consists of two components, which are attached to the opposing surfaces to be fastened. The hook-and-loop fastener 43 can have a width equal to or more than 10 mm to provide suitable sealing properties to the closure 41. Further, the hook-and-loop fastener 43 can have a width equal to or less than 150 mm, more preferably equal to or less than 100 mm, and most preferably equal to or less than 60 mm to improve an easiness of the installation process and/or manufacturing process of the filter bag 1.

The components of the hook-and-loop fastener 43, i.e., the hook component 44 and the loop component 45, are preferably fixed (for example sewn) to opposing surfaces.

Figure 5A:
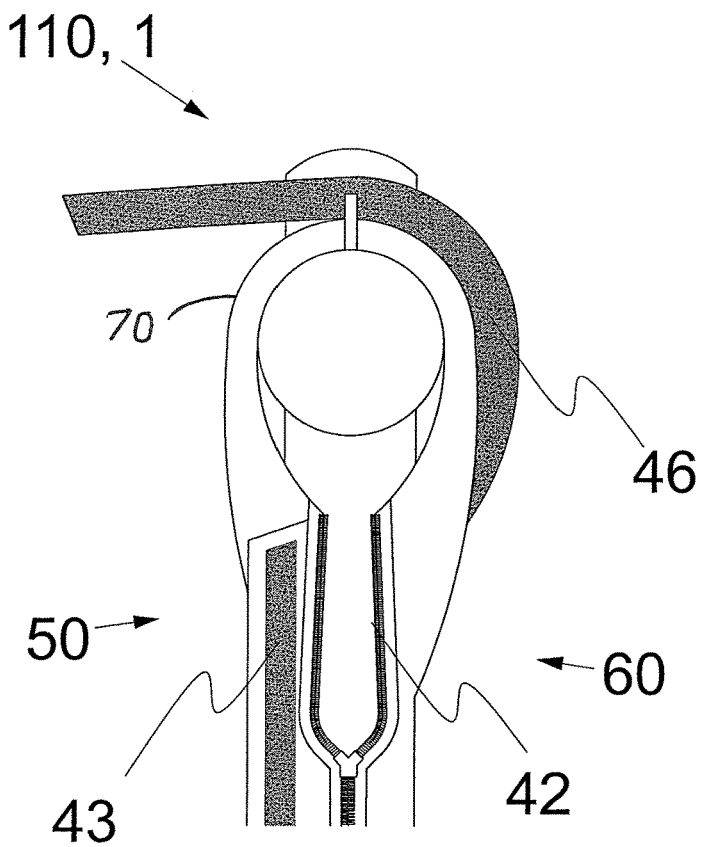
FIG. 5a illustrates a part of a filter bag comprising a zipper, a hook-and-loop fastener, and a hook-and-loop strip, examined in a second direction, perpendicular to the first direction.
Figure 5B:
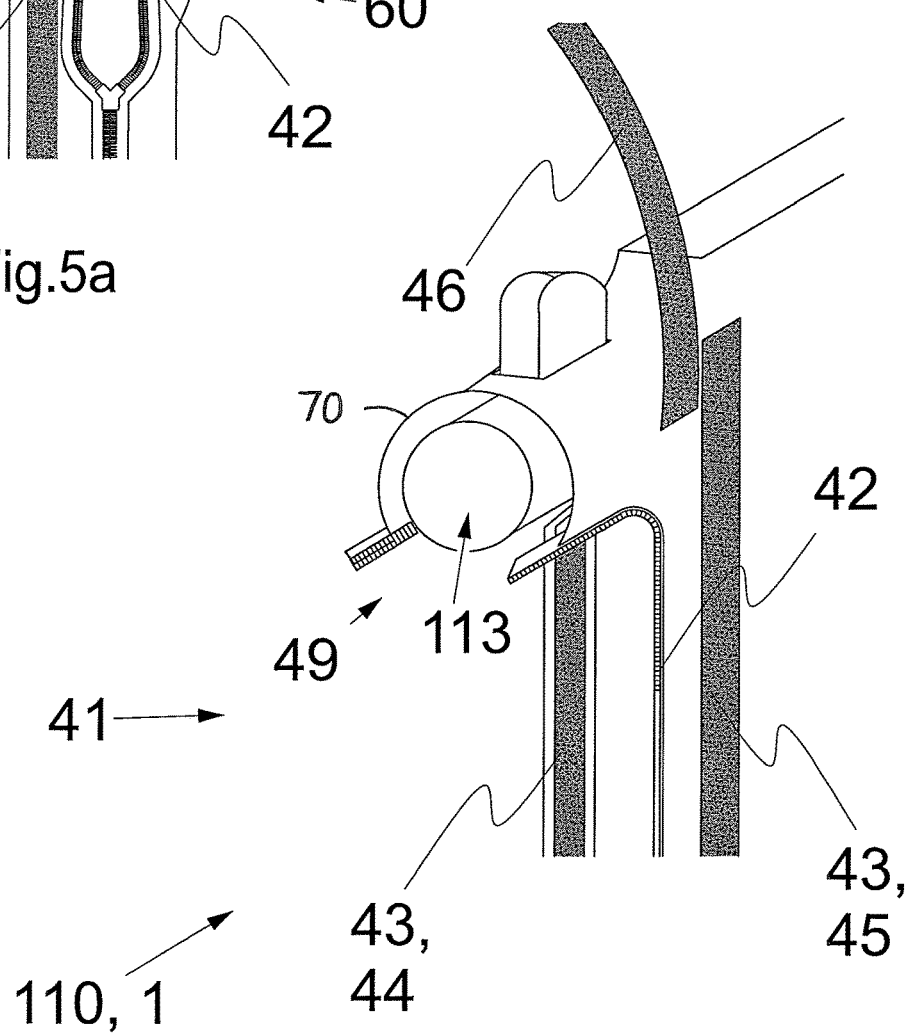
FIG. 5b illustrates a perspective view of a part of a filter bag comprising a zipper, a hook-and-loop fastener, and a hook-and-loop strip.

As illustrated in FIGS. 5a and 5b, the hook component 44 and the loop component 45 can be fixed to cover a zipper 42. Thus, the hook-and-loop fastener 43 can be able to seal the closable and openable edge 41 together with the zipper 42. Furthermore, the hook-and-loop fastener 43 can protect the zipper 42. This embodiment can be particularly advantageous for the horizontal pressure leaf filters.

As illustrated in FIGS. 7-9b, the hook component 44 can be fixed to the first sheet portion 50, and the loop component 45 can be fixed to the second sheet portion 60 so that they are fixed to opposing surfaces to be fastened. Thus, the hook-and-loop fastener 43 can seal the interface between the inner side of the filter bag 1 and the outer side of the filter bag 1. Furthermore, the zipper 42 can be fastened onto the hook-and-loop fastener 43 in order to protect the hook-and-loop fastener 43. This embodiment can be particularly suitable for the vertical pressure leaf filters.

Figure 7:
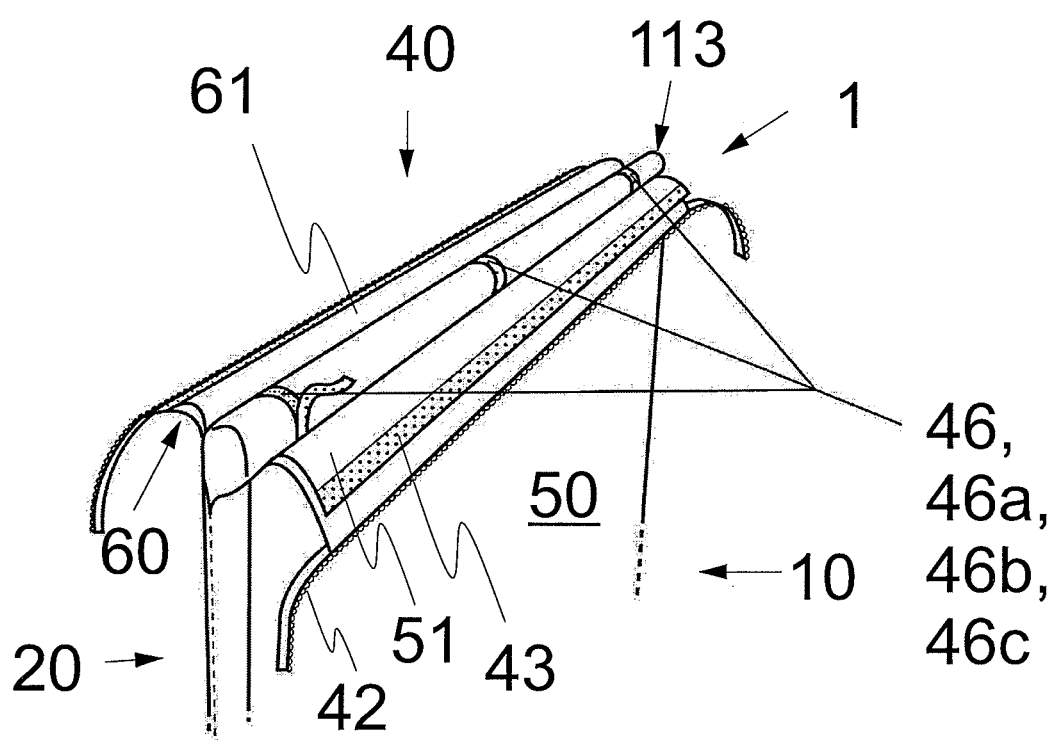
FIG. 7, FIGS. 8a-b, and FIGS. 9a-b illustrate embodiments of a filter bag, which is adapted for a vertical pressure leaf filter.

In an embodiment, the hook component 44 and the loop component 45 can be fixed to inner surfaces 51, 61 of the sheet portions 50,60 as shown in FIG. 7.

In FIGS. 5b, 7, 8a and 8b, the openable and closable edge 40 is open to show some advantageous details of the sealing system.

The first component of the hook-and-loop fastener 43, i.e. the hook, comprises several tiny hooks per each square cm. The second component, i.e., the loop, comprises several small loops. As a person skilled in the art knows, the hooks catch in the loops when said two components are pressed together, hence, the two components are attached to each other.

There are various strengths, materials and constructions available for hook-and-loop fasteners in the market. However, due to harsh conditions, many of those cannot be used, for example, in alumina production.

The most common trademark of the hook-and-loop fastener is Velcro®. The hook-and-loop fastener used in the leaf filter bag 1 can be the Velcro® fastener. There are also other hook-and-loop fasteners, for example from 3M, in the market. Thus, the hook-and-loop fastener used in the leaf filter bag does not need to be the Velcro® fastener.

The hook-and-loop fastener 43 can comprise
polypropylene, and/or
polyamide, and/or
polytetrafluoroethylene, and/or
polyvinylidene fluoride, and/or
polyphenylene sulfide,
the amount of said materials being preferably at least 50 wt. %, more preferably at least 70 wt. %, and most preferably at least 90 wt. % calculated of total weight of the hook-and-loop fastener 43. However, also other materials with shown evidence of resistance to the operating conditions of the application can be used.

Advantageously, the hook-and-loop fastener 43 comprises or consists of polypropylene and/or polyamide. Preferably, the hook-and-loop fastener consists of non-woven polypropylene and/or polyamide. The sealing of the leaf filter bag 1 must be resistant to the operating conditions, such as a temperature around 100° C. and pH around 13. For example, hook-and-loop fasteners made of nylon or polyester cannot typically be used for the novel filter bags.

The hook-and-loop fastener 43 can be used, not merely for closing the openable and closable edge 40, but also sealing the openable and closable edge 40. Thus, the hook-and-loop fastener 43 can be placed so that it can seal the openable and closable edge 40.

Preferably, the hook-and-loop fastener 43 seals the openable and closable edge 40 from the first edge 10 to the second edge 20. However, as discussed, the outlet pipe aperture 49 for the outlet pipe 113 may need to be taken into account. Thus, the hook-and-loop fastener 43 is preferably placed along the length of the openable and closable edge 40 from the first edge 10 to the outlet pipe aperture 49 or to the second edge 20 to form the seal for the filter bag 1.

Advantageously, the hook-and-loop fastener 43 extends at least from the first edge 10 of the filter bag 1 along the closable edge 40 to the outlet pipe aperture 49 of the filter bag 1. Thus, the hook-and-loop fastener 43 can be placed along the entire length of the openable and closable edge 40 from the first edge 10 to the second edge 20 or to the outlet pipe aperture 49 to form the seal for the filter bag 1. Further, in embodiments having an outlet pipe aperture e.g. in the middle of the openable and closable edge 40, the hook-and-loop fastener 43 can extend along the length of the openable and closable edge 40 from the second edge 20 of the filter bag 1 to the outlet pipe aperture 49.

Figure 4:
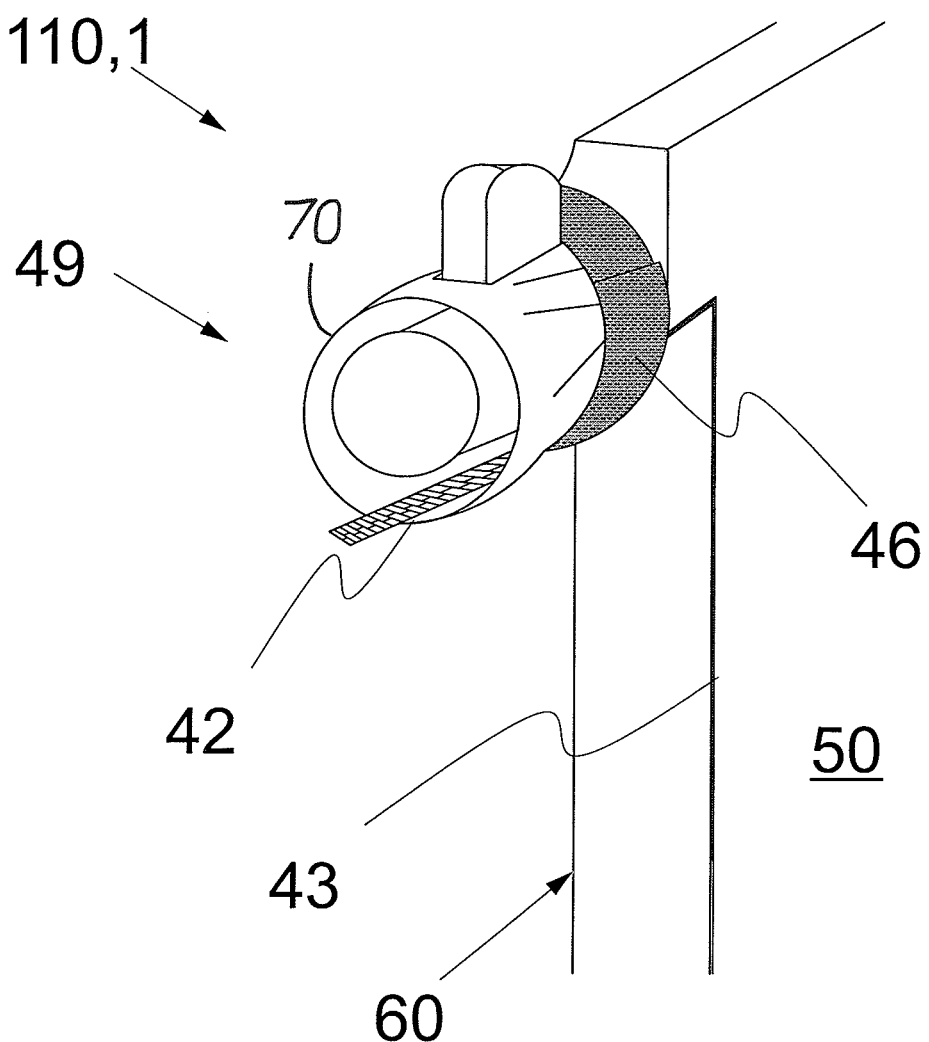

As shown in FIG. 5b, an outlet pipe 113 of a horizontal filter leaf extends horizontally from within the enclosure of the leaf filter bag 1 through the openable and closable fourth edge 40. A pipe flap 70 of the bag 1 extends from the first sheet portion 50 and second sheet portion and extends around the outlet pipe 113. As shown in FIG. 5a the zipper 42 has two parts, one secured to each of the first sheet portion and the second sheet portion beneath the outlet pipe 113 and which extend upwardly and outwardly onto the pipe flap 70. When the zipper 42 is zipped closed, as shown in FIG. 4, the pipe flap 70 is formed into an encircling tube around the outlet pipe 113, which defines the outlet pipe aperture 49. The hook and loop fastener strip 46, as shown in FIG. 4 can be wrapped around the pipe flap 70 to encircle and secure the zipped pipe flap 70 about the outlet pipe 113.

As discussed above, the hook-and-loop fastener 43 can be fixed to the filtration bag 1. The hook-and-loop components 44, 45 can be fastened in their places by sewing the components to the openable and closable edge 40 of the leaf filter bag 1.

Thanks to the hook-and-loop fastener 43, which can be used to seal the openable and closable edge 40 of the filter bag 1 and/or to protect the zipper 42, the installation process can be easy and safe.

As discussed above, the closure 41 typically comprises a zipper 42 as shown in FIGS. 3-10. The zipper 42 can be fixed to the openable and closable edge of the filter bag. The zipper 42 can be used to secure and/or to seal the openable and closable edge 40 of the filter bag 1 and/or to protect the hook-and-loop fastener 43.

Further, as discussed above, the hook-and-loop fastener 43 can be used to seal the filter bag 1 and/or to protect the zipper 42. Thus, if the leaf filter bag comprises the hook-and-loop-fastener 43, the zipper 42 can be fixed near the hook-and-loop fastener 43.

The zipper 42 can be used to ensure that the sealing made by the hook-and-loop fastener 43 stays during operating hours of the pressure leaf filter as shown in FIGS. 7-9b. Thus, the purpose of the zipper 42 can be to support and secure the sealing. This embodiment is particularly advantageous with the vertical pressure leaf filters.

The hook-and-loop fastener 43 can be used to ensure that the sealing made by the zipper 42 stays during operating hours of the pressure leaf filter as shown in FIGS. 4-5b. Thus, the purpose of the hook-and-loop fastener 43 can be to support and secure the sealing. This embodiment is particularly advantageous with the horizontal pressure leaf filters.

Figure 6A:
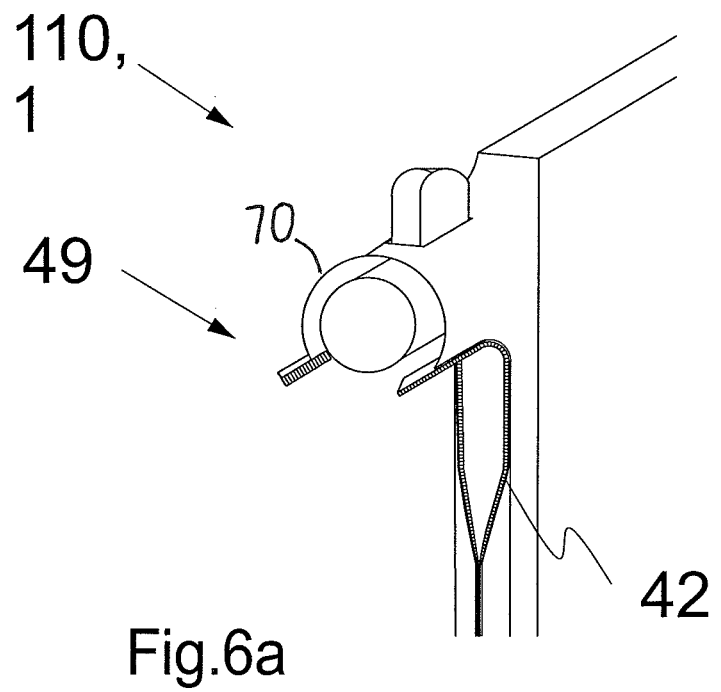
Figure 6B:
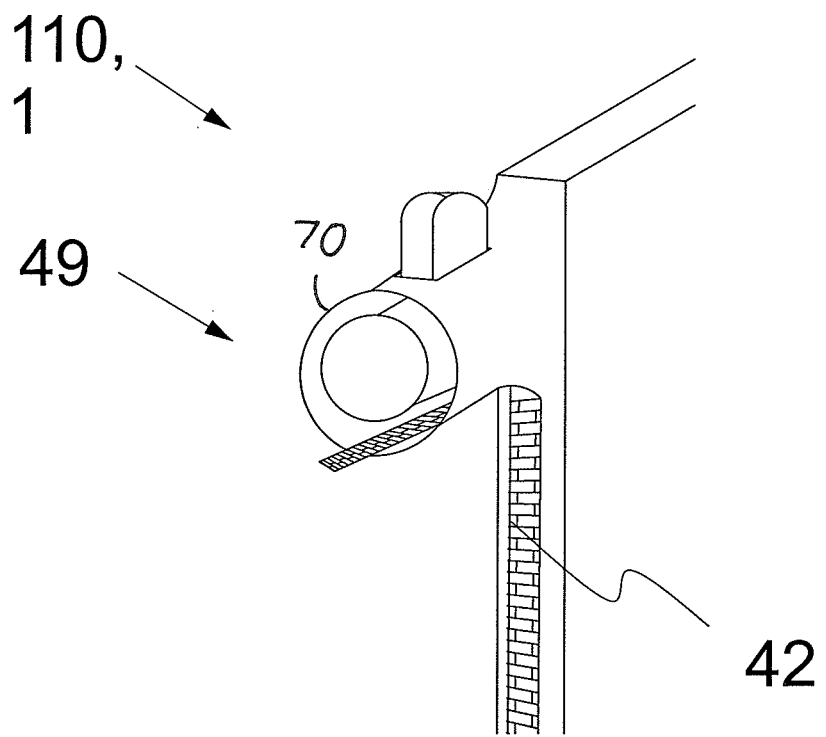

Securing of the filter bag 1 has been challenging due to the closed, pressurized filters. Thanks to the novel solution, the zipper 42 can be used to secure the closable edge 40 of the filter bag. Preferably, the closure 41 of the filter bag 1 comprises both the zipper 42 and the hook-and-loop fastener 43. However, in some embodiments, particularly with the horizontal pressure leaf filters, the zipper 42 may be used for both, i.e., for sealing and securing the openable and closable edge 40 as shown in FIGS. 6a-6b. Thus, in some embodiments, the filter bag 1 can be closed and sealed with the zipper 42.

The zipper can comprise
polypropylene, and/or
metal(s), e.g. at least one of stainless steel, bronze and brass, and/or
polytetrafluoroethylene, and/or
polyvinylidene fluoride, and/or
polyphenylene sulfide,
the amount of said materials being preferably at least 70 wt. %, more preferably at least 90 wt. % and most preferably at least 95 wt. %, calculated of total weight of the zipper 42. However, also other materials that show evidence of resistance to the operating conditions of the application can be used. The closure 41 of the filter bag 1 must be resistant to the operating conditions, such as a temperature above 100° C. and pH around 13. For example, zippers made of nylon or polyester cannot typically be used for those filter bags which are used in alumina production. Advantageously, the zipper 42 comprises or consists of polypropylene and/or metal.

The zipper 42 can wear down due to the harsh operation conditions. Thus, in an embodiment, the zipper 42 comprises a coating layer in order to have a protection from the environment. The zipper can comprise a coating layer applied e.g. as a liquid layer, foam layer, electrostatic coating layer, or PVD coating layer (i.e., physical vapor deposition coating). The coating layer, if used, can comprise e.g. polyurethane and/or epoxy resin and/or nanoparticles and/or other plastic materials e.g. PTFE and/or PVC. However, the zipper does not need to have said coating layer at all.

The zipper 42 is fixed so that it can close the openable and closable edge 40. Preferably, the zipper 40 is fixed so that it can close the openable and closable edge 40 from the first edge 10 to the outlet pipe aperture 49 and/or to the second edge 20. Thus, the zipper 42 can be placed along the length of the openable and closable edge 40, preferably along the entire length of the openable and closable edge 40 from the first edge to the second edge or to the outlet pipe aperture 49.

In an embodiment, the filter bag is a filter bag of a horizontal pressure leaf filter and the zipper 42 extends from the first edge 10 of the filter bag 1 along the closable edge 40 to the outlet pipe aperture 49 of the filter bag 1. The closure 41 can be adapted for the different size and position of the outlet pipe 113.

In an embodiment, the filter bag is a filter bag of a vertical pressure leaf filter and the zipper 42 extends from the first edge 10 of the filter bag 1 along the entire length of the closable edge 40 to second edge 20 of the filter bag.

In an embodiment, the filter bag comprises an outlet pipe aperture 49 which is not near the first edge 10 or the second edge 20 and the zipper 42 extends along the length of the openable and closable edge 40 from the first edge 10 to the outlet pipe aperture 49 and, further, from the second edge 20 of the filter bag 1 to the outlet pipe aperture 49. Therefore, the zipper 42 can be used to secure the closure 41 with differently positioned outlet pipes 113.

The zipper 42, as well as the hook-and-loop fastener 43, can be easily closed. Good care and maintenance of the pressure leaf filters 100 is required to keep them in good condition. The maintenance may require additional cleaning, which may cause damage to the manually sewed filter bag. Particularly, manually sewed edges of the bag may leak easily. Thus, the novel filter bag may reduce the risk of damaging the filter bag during maintenance.

The closure 41 comprising the hook-and-loop fastener 43 and the zipper 42 allows installing the filter bag manually, without a need of a manual sewing machine.

The closure 41 can further comprise one or more than one hook-and-loop strip 46, for example one hook-and-loop strip 46, or from 2 to 10 hook-and-loop strips 46. The closure 41 can comprise a first hook-and-loop strip 46a and/or a second hook-and-loop strip 46b and/or a third hook-and-loop strip 46c. The hook-and-loop strip(s) 46 can be particularly advantageous for pre-closing vertical pressure leaf filters as shown in FIGS. 7 and 8a, and/or for securing the filter bag onto an outlet pipe 113 of a horizontal pressure leaf filter as shown in FIGS. 4-5b.

Figure 8A:
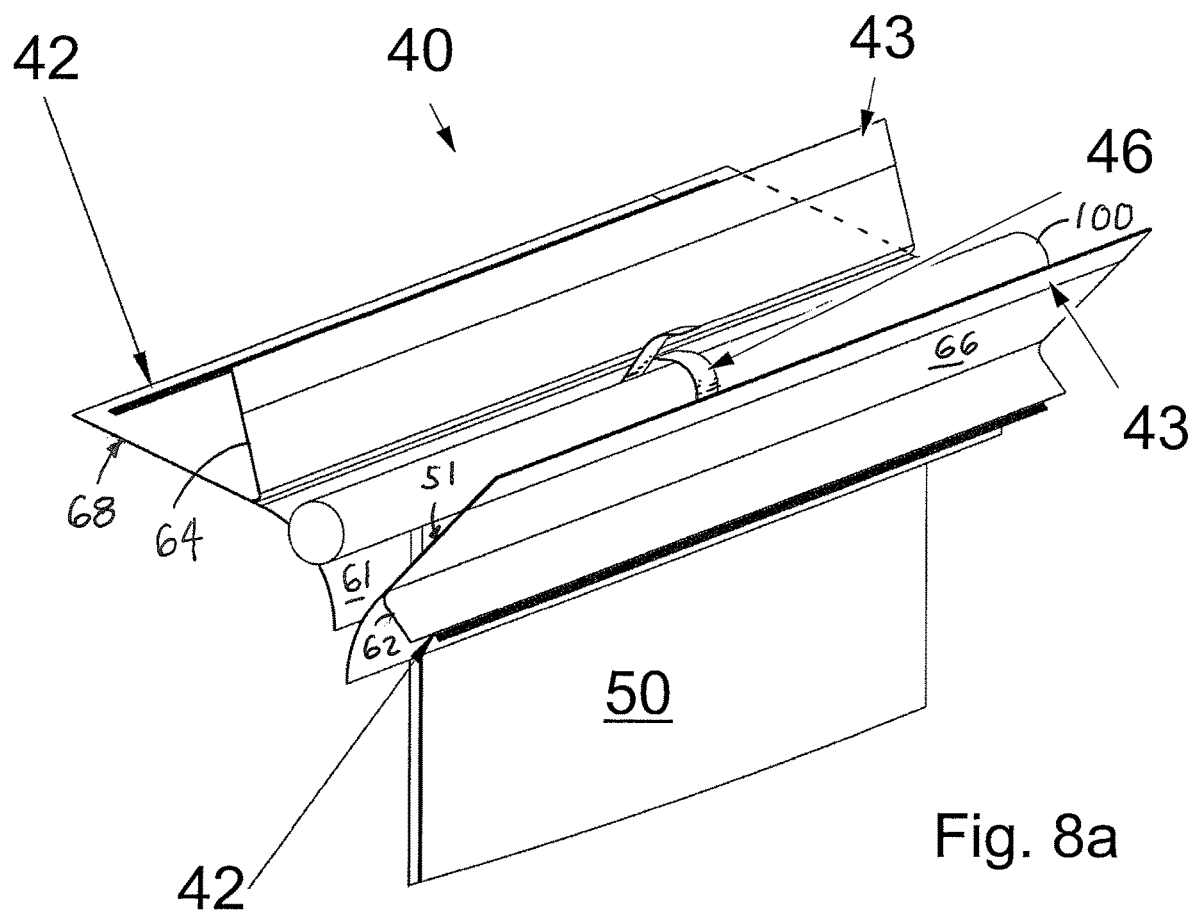
Figure 8B:
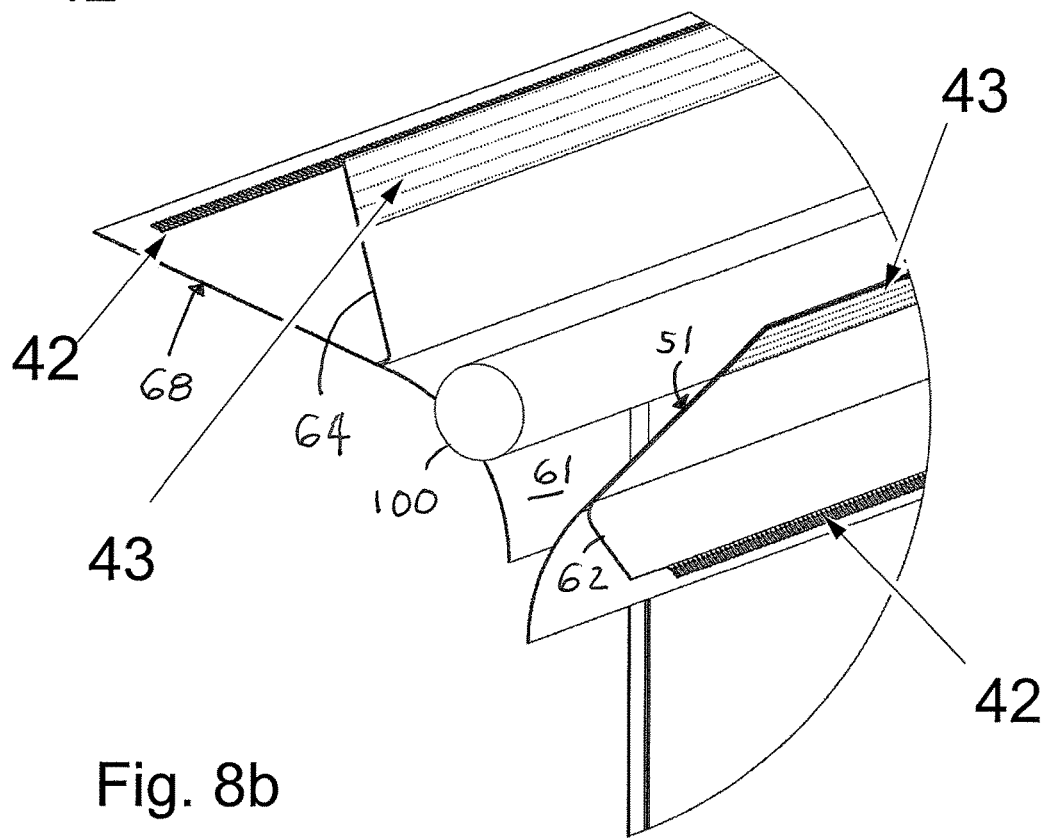

In FIGS. 7 and 8a, the openable and closable edge 40 is open to show the hook-and-loop strip(s) 46 which are used to pre-close the leaf filter bag 1. The hook-and-loop strips 46 placed according to this embodiment may not be suitable to seal the openable and closable edge, but they can make the installing process easier, particularly for vertical pressure filters.

Thus, the hook-and-loop strip(s) 46 can be used to pre-close the filter bag as shown in FIGS. 7 and 8a. The strips are preferably located near the openable and closable edge. Further, if there is more than one hook-and-loop strip 46 for pre-closing the filter bag 1, the strips 46 are preferably spaced from each other. This may improve an easiness of the installation process, particularly with vertical pressure leaf filters.

The components of the hook-and-loop strips 46, i.e., the hook component and the loop component, are preferable fixed, such as sewn, to the sheet portions 50,60 so that they are sewn to opposing surfaces to be fastened. The hook component 44 of the hook-and-loop strips can be mounted to a first sheet portion 50 of the filter bag, and the loop component can be mounted to a second sheet portion 60 of the filter bag 1, or vice-versa. Thus, the hook-and-loop strips 46 can be used to pre-close the openable and closable edge 40 when said two components are pressed together and attached to each other.

Figure 9A:
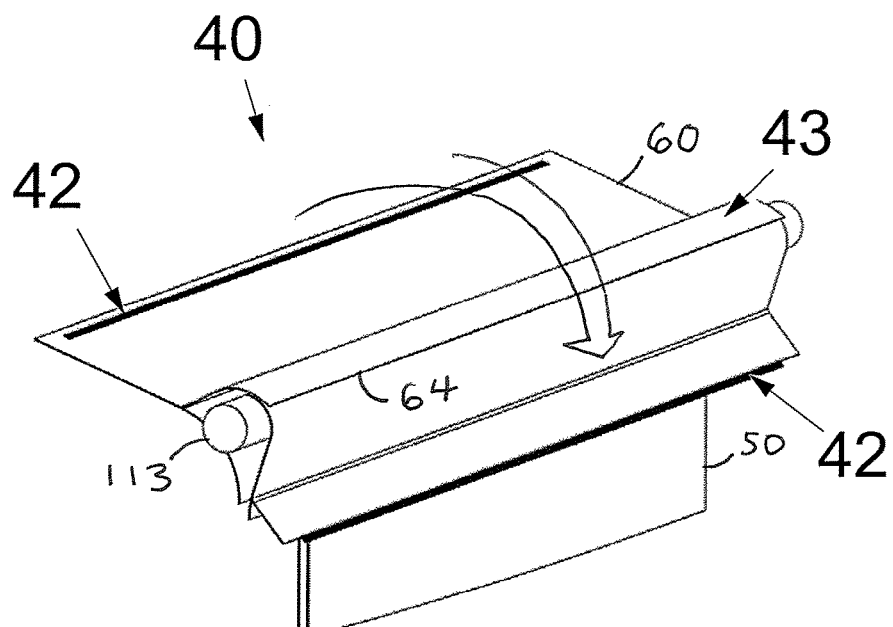
Figure 9B:
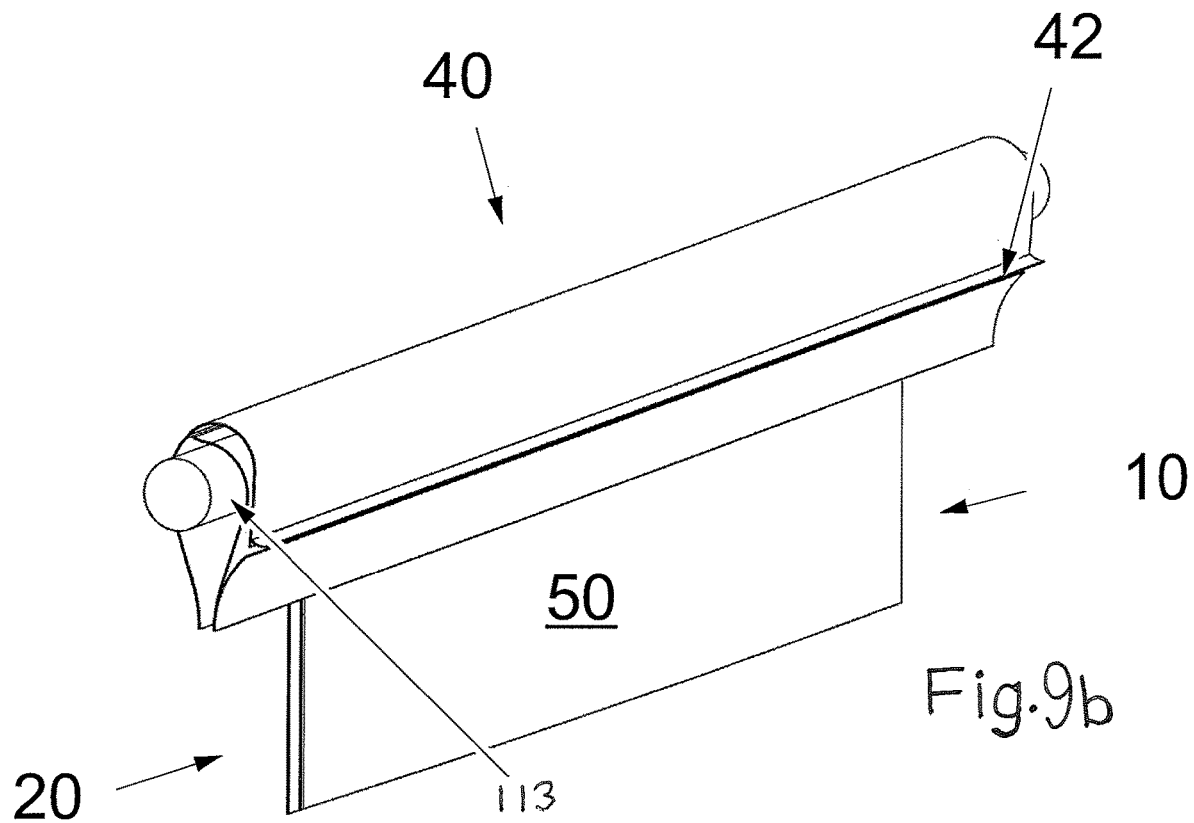
Figure 10:
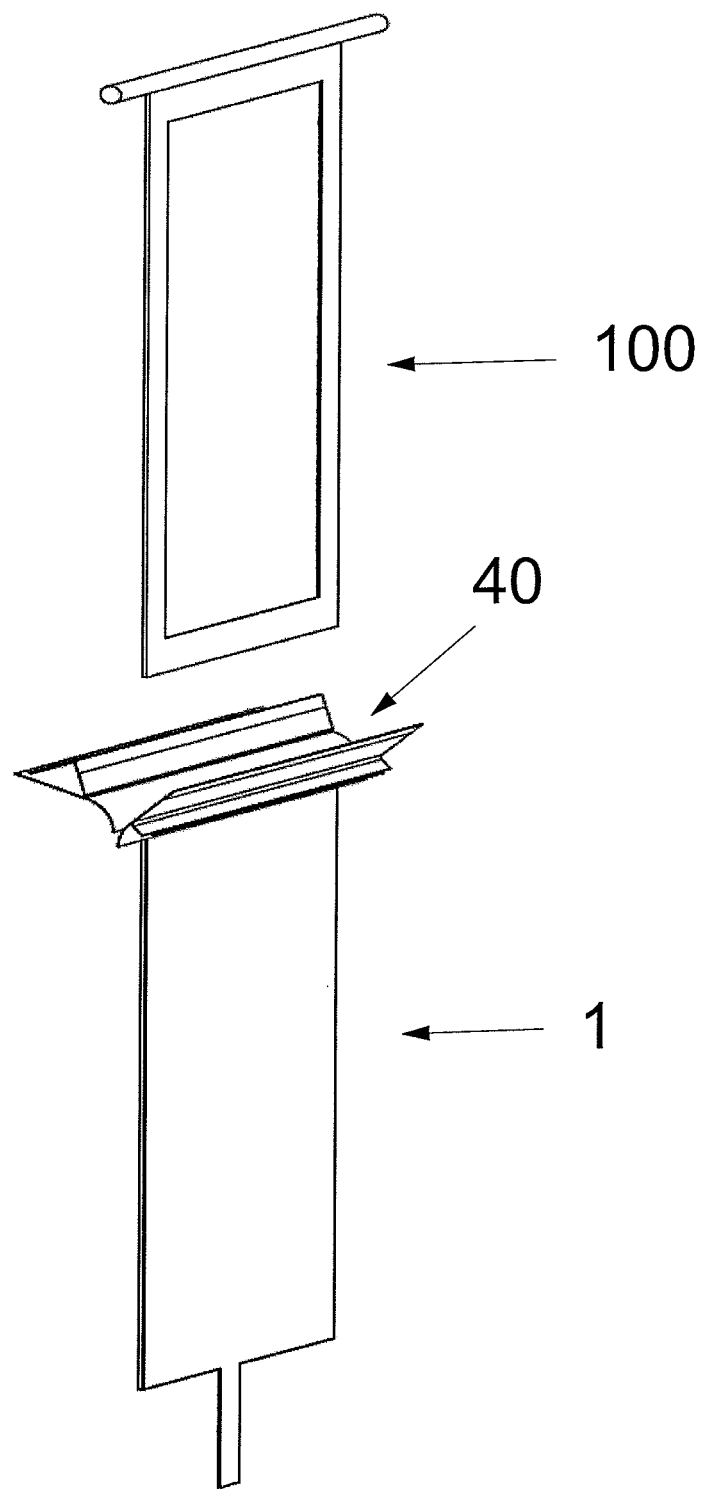
FIG. 10 illustrates an installation process of the filter bag, showing a leaf which will be placed into the filter bag.

As shown in FIGS. 8a, 8b, 9a and 9b, the leaf filter bag 1 for a vertical pressure leaf filter forms an enclosure for the pressure leaf filter 100 which is introduced into the leaf filter bag 1 through an opening defined between the first sheet portion 50 and the second sheet portion 60. The first sheet portion 50 has an inner side 51 which faces the inner side 61 of the second sheet portion 60 within the enclosure. A first flap 62 is secured along an edge to the exterior surface 66 of the first sheet portion 50, and one half of the zipper 42 is secured thereto. A second half of the zipper 42 is fastened to the inner surface 61 of the second sheet portion 60. A second flap 64 is fastened to the inner surface 61 of the second sheet portion 60 along an edge located between the zipper half and the enclosure interior of the bag 1. One strip of the hook-and-loop fastener 43 is fastened to the exterior surface 66 of the first sheet portion adjacent the sheet portion's peripheral edge. The other strip of the two-part hook-and-loop fastener 43 is fastened to a peripheral free edge of the second flap 64. To close the enclosure around the pressure leaf filter 100, the second flap 64 is folded around the outlet pipe 113 of the pressure leaf filter 100 to bring the two strips of the hook-and-loop fastener 43 to overlie one another and are releasably secured by being pressed together, as shown in FIG. 9a. To complete the sealing of the leaf filter bag about the pressure leaf filter 100, the second sheet portion 60 is folded over the closure defined by the connected hook-and-loop fastener to thereby permit the two parts of the zipper to be engaged with each other as shown in FIG. 9b.

Alternatively, or in addition, one or more than one hook-and-loop strip 46 can be used to secure the sealing of the outlet pipe aperture 49 as shown, e.g., in FIG. 4. In this embodiment, which can be particularly suitable for horizontal pressure leaf filters, the leaf filter bag 1 can be particularly suitable to be used with high pressures, at least up to 5 bars. Thus, the hook-and-loop strip 46 can be used, together with other sealing components, to seal the leaf filter bag 1 onto a leaf having the outlet pipe 113.

The hook-and-loop strips 46,46a, 46b, 46c can be so called Velcro® strips, but also hook-and-loop strips with other trademarks (brands) can be used.

The hook-and-loop strips can comprise
polypropylene, and/or
polyamide, and/or
polytetrafluoroethylene, and/or
polyvinylidene fluoride, and/or
polyphenylene sulfide,
the amount of said materials being preferably at least 70 wt. %, more preferably at least 90 wt. % calculated of total weight of the hook-and-loop strips 46. However, also other materials with shown evidence of resistance to the operating conditions of the application can be used. Preferably, the hook-and-loop strip(s) 46 comprise or consist of polypropylene and/or polyamide. Preferably, the hook-and-loop fastener consists of non-woven polypropylene and/or polyamide.

As discussed above, the closure 41 can comprise the zipper 42 and the hook-and-loop fastener 43. The zipper 42 can be used e.g. to close the leaf filter bag 1 and/or to protect the hook-and-loop fastener 43, and the hook-and-loop fastener 43 can be used e.g. to seal the filter bag 1 and/or to protect the zipper 42.

Further, the closure 41 can comprise the hook-and-loop strip(s) 46, which can be used e.g. to pre-close the filter bag and/or to seal the outlet pipe aperture portion of the filter bag onto the outlet pipe 113.

An installing method for installing the leaf filter bag 1 on to a leaf 110 of a pressure leaf filter 100 can comprise the following steps:
  providing a filter bag 1 comprising a closure 41 comprising a zipper 42,
  inserting the leaf 110 into the leaf filter bag 1 through an openable and closable edge 40 of the leaf 110, and
  securing the filter bag 1 onto a leaf 110 of the pressure leaf filter 100 by using said closure.

Thus, the installing process can be implemented without a sewing machine.

The filter bag can further comprise a hook-and-loop fastener 43 having a hook component 44 and a loop component 45, wherein the installing method can further comprise the following steps:
- fastening a hook component 44, preferably fixed to a first sheet portion, to a loop component 45, preferably fixed to a second sheet portion, in order to close the hook-and-loop fastener 43.

Thus, the sealing of the filter bag 1 onto the pressure leaf filter 100 and/or protecting the zipper 42 can be implemented by the hook-and-loop fastener 43.

Further, the closing system can comprise hook-and-loop strip(s) 46. The hook-and-loop strip(s) 46 can be fixed
- inside the filter bag 1 to pre-close the filter bag, hence, the strip(s) 46 can be used to hang the filter bag onto a metallic frame of the filter before sealing the leaf filter bag 1, and/or
- to the outer surface of the filter bag 1 to seal the outlet pipe aperture portion of the filter bag.

The installing method can further comprise the following steps:
- attaching the filter bag onto a frame 122 of the leaf 110 by using hook-and-loop strip(s) 46 before securing the filter bag onto the leaf 110. Thus, the filter bag 1 can be pre-closed before it is sealed, hence, easiness of the installing process may be improved.

The installing method can further comprise the following step:
- sealing the outlet pipe aperture 49 by using at least one hook-and-loop strip 46.

The closing system of the novel filter bag 1 can comprise the zipper 42 and the hook-and-loop fastener 43. The hook-and-loop fastener 43 can be fixed to the filter bag, near the zipper 42.

If the closing system comprises
- the zipper 42,
- the hook-and-loop fastener 43, and
- the hook-and-loop strips 46, and the hook-and-loop strip(s) 46 are fixed inside the filter bag 1 to pre-close the filter bag, the leaf filter bag 1 can be efficiently installed by first pre-attaching the leaf filter bag by using the strip(s) 46, and then sealing and securing the leaf filter bag. This embodiment can be particularly advantageous for vertical pressure leaf filters.

The hook-and-loop strip(s) 46 can have a width equal to or more than 10 mm to provide suitable properties for the closure 41. Further, the hook-and-loop strip(s) 46 can have a width equal to or less than 150 mm, more preferably equal to or less than 100 mm, and most preferably equal to or less than 60 mm to improve the easiness of the installation process.

Furthermore, the hook-and-loop strip(s) 46 can have a length equal to or more than 100 mm, and equal to or less than 500 mm to provide suitable pre-closing properties to the closure or to provide suitable sealing properties for the outlet pipe aperture portion.

The novel leaf filter bag 1 can be used in harsh environment, such as in alumina refining process. The novel leaf filter bag can be used, not only in alumina production, but also in other industries, such as in sugar and sweetener industry.

Thanks to the novel solution, there is no need for additional special tools, such as a manual sewing machine, but the filter bag can be installed with its own attaching means. Thus, the installation process of the filter bag can be easier and faster than conventionally.

Manual sewing is dependent upon the individual's working skill. However, the zipper and the hook-and-loop fastener can be easily used. Furthermore, the leaf filter bag 1 having the zipper 42 and/or the hook-and-loop fastener 43 and/or the hook-and-loop strip(s) 46 can be easily replaced when needed due to the easy installation process of the novel filter bag.

Furthermore, the novel solution can improve safeness of individual during the installation process because the new closing system can reduce the risk of accidents. Moreover, the filter bag can be easy to use. Still further, the novel closing system can improve the lifetime of the leaf filter bag, e.g. because it may eliminate the cases wherein the filter bag drops from the metallic frames of the pressure leaf filter.

The examples described above are intended to be exemplary only. For example, some embodiments, particularly relating to the horizontal pressure filters, can benefit from having only one main component for the closure system, such as the zipper, but some other embodiments, particularly relating to the vertical pressure filters, can benefit from having at least two main components for the closure system, such as the zipper and the hook-and-loop fastener, preferably three components for the closure system, i.e. the zipper, the hook-and-loop fastener and the hook-and-loop strip(s). Thus, the presence of two or three main components is optional, advantageous embodiment.

We claim:

1. A leaf filter bag for a leaf of a pressure leaf filter, the leaf filter bag comprising:
   - a first sheet portion;
   - a second sheet portion adjacent to the first sheet portion, and connected to the first sheet portion along a first edge, a second edge and a third edge to define an enclosure for a leaf, wherein an openable and closable edge is defined by the first sheet portion and the second sheet portion between the first edge and the second edge which defines an opening for the reception into the enclosure of a frame of the leaf in an open position;
   - a closure comprising a zipper and a hook-and-loop fastener, wherein the zipper is positioned at the openable and closable edge for closing the openable and closable edge after the frame of the leaf is received within the enclosure defining a closed position of the leaf filter bag, wherein the zipper is placed along the length of the openable and closable edge of the leaf filter bag, and wherein the hook-and-loop fastener is fixed to the filter bag along the length of the openable and closable edge; and
   - a pipe flap which extends outwardly from the first sheet portion and the second sheet portion, and wherein the zipper has two parts, one secured to each of the first sheet portion and the second sheet portion beneath an outlet pipe of a leaf enclosed within the leaf filter bag and which extend upwardly and outwardly onto the pipe flap, such that when the zipper is zipped closed the pipe flap is formed into an encircling tube which can extend around the outlet pipe.

2. The leaf filter bag of claim 1 wherein the zipper in the closed position closes the filter bag so that the hook-and-loop fastener, or at least a part of the hook-and-loop fastener, is inside the filter bag.

3. The leaf filter bag of claim 1 wherein the hook-and-loop fastener covers the zipper or at least part of the zipper in the closed position.

4. The leaf filter bag of claim 1 wherein the closure further comprises one or more than one hook-and-loop strip(s).

5. The leaf filter bag of claim 1 wherein the openable and closable edge comprises an outlet pipe aperture for reception therethrough of an outlet pipe of the leaf and the closure is placed along the length of the openable and closable edge from the first edge to the outlet pipe aperture.

6. The leaf filter bag of claim 5, wherein the zipper is placed along the length of the openable and closable edge from the first edge of the leaf filter bag to the outlet pipe aperture of the leaf filter bag.

7. The leaf filter bag of claim 1, wherein the closure is placed along the entire length of the openable and closable edge from the first edge to the second edge.

8. The leaf filter bag of claim 1, wherein the leaf filter bag is a single pocket filter bag.

9. The leaf filter bag of claim 1 further comprising a horizontal pressure leaf filter, wherein the leaf filter bag is secured on to a leaf of the horizontal pressure leaf filter.

10. The leaf filter bag of claim 1 further comprising a vertical pressure leaf filter, wherein the leaf filter bag is secured on to a leaf of the vertical pressure leaf filter.

11. A leaf filter bag for a leaf of a pressure leaf filter, the leaf filter bag comprising:
a first sheet portion;
a second sheet portion adjacent to the first sheet portion, and connected to the first sheet portion along a first edge, a second edge and a third edge to define an enclosure for a leaf, wherein an openable and closable edge is defined by the first sheet portion and the second portion between the first edge and the second edge which defines an opening for the reception into the enclosure of a frame of the leaf in an open position;
a closure comprising a zipper and a hook-and-loop fastener, wherein the zipper is positioned at the openable and closable edge for closing the openable and closable edge after the frame of the leaf is received within the enclosure defining a closed position of the leaf filter bag, wherein the zipper is placed along the length of the openable and closable edge of the leaf filter bag, and wherein the hook-and-loop fastener is fixed to the filter bag along the length of the openable and closable edge;
wherein the first sheet portion has an exterior surface and an opposite inner surface, and wherein the second sheet portion has an exterior surface and an opposite inner surface, wherein the first sheet portion is connected to the second sheet portion such that the first sheet portion inner surface faces the second sheet portion inner surface, and wherein the hook and loop fastener comprises a first part fastened to the outer surface of the first sheet portion and a second part fastened to the inner surface of the second sheet portion, and wherein the zipper comprises a first part fastened to the outer surface of the first sheet portion outwardly of the hook and loop fastener first part, and a second part fastened to the inner surface of the second sheet portion outwardly of the hook and loop fastener second part, and further comprising:
a first flap fastened to the outer surface of the first sheet, wherein the first part of the zipper is fastened to the first flap; and
a second flap fastened to the inner surface of the second sheet portion, wherein the second part of the hook and loop fastener is positioned on the second flap such that the second flap is passable over the enclosed leaf to engage the first part of the hook and loop fastener, and wherein the first part of the zipper is fastened to the first flap and such that the second sheet portion with the second part of the zipper thereon is passable over the engaged parts of the hook and loop fastener to engage the first flap first zipper part.

12. The leaf filter bag of claim 11 further comprising a pipe flap which extends outwardly from the first sheet portion and the second sheet portion, and wherein the zipper has two parts, one secured to each of the first sheet portion and the second sheet portion beneath an outlet pipe of a leaf enclosed within the leaf filter bag and which extend upwardly and outwardly onto the pipe flap, such that when the zipper is zipped closed the pipe flap is formed into an encircling tube which can extend around the outlet pipe.

13. The leaf filter bag of claim 12 further comprising a hook and loop fastener strip secured to the pipe flap for wrapping around the pipe flap to encircle and secure the zipped pipe flap about an outlet pipe.

14. The leaf filter bag of claim 11 further comprising:
a first strip secured to the inner surface of the first sheet within the enclosure;
a second strip secured to the inner surface of the second sheet within the enclosure; and
a hook and loop fastener comprising a first part fastened to the first strip, and a second part fastened to the second strip, the first strip and the second strip being long enough to extend over and be secured together over the leaf received within the leaf filter bag.

15. The leaf filter bag of claim 1 further comprising a hook and loop fastener strip secured to the pipe flap for wrapping around the pipe flap to encircle and secure the zipped pipe flap about an outlet pipe.

* * * * *